(12) United States Patent
Crepin et al.

(10) Patent No.: US 8,489,301 B2
(45) Date of Patent: Jul. 16, 2013

(54) CLOSED-LOOP CONTROL OF BRAKE PRESSURE USING A PRESSURE-LIMITING VALVE

(75) Inventors: Bettina Crepin, Stuttgart (DE); Michael Bunk, Heilbronn (DE); Roland Galbas, Ludwigsburg (DE); Ralf Kinder, Backnang (DE); Matthias Schanzenbach, Eberstadt (DE); Christoph Betz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 712 days.

(21) Appl. No.: 12/227,009

(22) PCT Filed: May 3, 2007

(86) PCT No.: PCT/EP2007/054306
§ 371 (c)(1),
(2), (4) Date: Apr. 17, 2009

(87) PCT Pub. No.: WO2007/125130
PCT Pub. Date: Nov. 8, 2007

(65) Prior Publication Data
US 2009/0210127 A1 Aug. 20, 2009

(30) Foreign Application Priority Data
May 3, 2006 (DE) .......................... 10 2006 020 520

(51) Int. Cl.
*B60T 11/12* (2006.01)
(52) U.S. Cl.
CPC ............. *B60T 11/12* (2013.01); *B60T 2250/00* (2013.01); *B60T 2270/88* (2013.01)
USPC .............................................. 701/75; 303/20

(58) Field of Classification Search
CPC .... B60T 11/12; B60T 2250/00; B60T 2270/88
USPC .............................................. 701/75; 303/20
See application file for complete search history.

(56) References Cited

U.S. PATENT DOCUMENTS

| | | | | |
|---|---|---|---|---|
| 2,417,211 | A | * | 3/1947 | Newell ........................ 303/118.1 |
| 6,030,055 | A | * | 2/2000 | Schubert ..................... 303/113.4 |
| 6,086,167 | A | * | 7/2000 | Heckmann et al. ............ 303/155 |
| 6,230,697 | B1 | * | 5/2001 | Itoyama et al. ........... 123/568.21 |
| 6,692,088 | B1 | * | 2/2004 | Zheng ......................... 303/113.1 |

(Continued)

FOREIGN PATENT DOCUMENTS

| DE | 40 02 865 | 8/1991 |
|---|---|---|
| DE | 197 07 960 | 9/1998 |

(Continued)

*Primary Examiner* — Mark Hellner
*Assistant Examiner* — Ari M. Diacou
(74) *Attorney, Agent, or Firm* — Kenyon & Kenyon LLP

(57) ABSTRACT

A device for controlling the brake pressure in a hydraulic brake system with the aid of a pressure-limiting valve that limits the brake pressure to a predefined threshold value, and to that end is driven by an electronic device in accordance with a valve characteristic curve. The setting accuracy can be improved considerably if an estimating unit for estimating the brake pressure, a sensor system for measuring the brake pressure, a unit for determining a pressure difference between the measured brake pressure and the estimated brake pressure, as well as a controller unit which drives the pressure-limiting valve as a function of the pressure difference are provided.

21 Claims, 1 Drawing Sheet

U.S. PATENT DOCUMENTS

| | | | |
|---|---|---|---|
| 6,851,764 B2 * | 2/2005 | Giers et al. | 303/115.2 |
| 7,010,410 B2 * | 3/2006 | Zhang et al. | 701/70 |
| 7,140,699 B2 * | 11/2006 | Gronau et al. | 303/113.4 |
| 7,537,292 B2 * | 5/2009 | Heubner et al. | 303/9.64 |
| 2003/0098613 A1 * | 5/2003 | Bohm et al. | 303/166 |
| 2003/0214183 A1 * | 11/2003 | Breitenbacher et al. | 303/162 |
| 2004/0080208 A1 * | 4/2004 | Giers et al. | 303/20 |
| 2004/0186648 A1 * | 9/2004 | Zheng et al. | 701/70 |
| 2005/0001481 A1 * | 1/2005 | Kley et al. | 303/191 |
| 2005/0082905 A1 * | 4/2005 | Gronau et al. | 303/11 |
| 2007/0276575 A1 * | 11/2007 | Zheng | 701/78 |
| 2009/0037065 A1 * | 2/2009 | Burkhard et al. | 701/71 |
| 2010/0121548 A1 * | 5/2010 | Muller et al. | 701/77 |
| 2011/0166762 A1 * | 7/2011 | Bunk et al. | 701/70 |

FOREIGN PATENT DOCUMENTS

| | | |
|---|---|---|
| DE | 102 00 771 | 8/2002 |
| WO | WO 95/19282 | 7/1995 |
| WO | WO 96/10507 | 4/1996 |
| WO | WO 96/14227 | 5/1996 |
| WO | WO 03/026941 | 4/2003 |
| WO | WO 2006/131368 | 12/2006 |

* cited by examiner

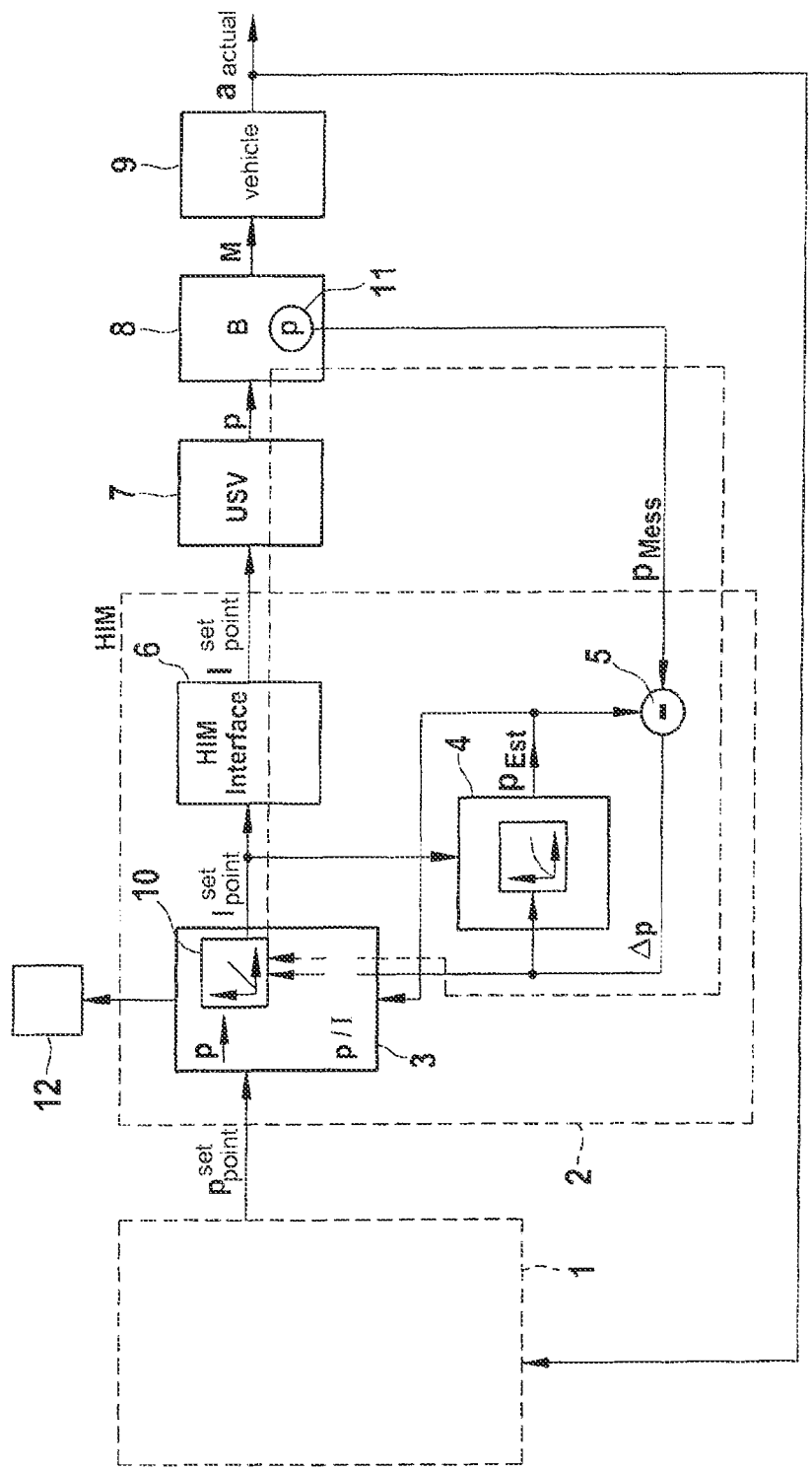

CLOSED-LOOP CONTROL OF BRAKE PRESSURE USING A PRESSURE-LIMITING VALVE

FIELD OF THE INVENTION

The present invention relates to a device for controlling the brake pressure in a brake system, particularly a hydraulic brake system, as well as a corresponding method.

BACKGROUND INFORMATION

Modern vehicles usually include various driver assistance systems which, in certain driving situations, automatically intervene in the vehicle operation in order to stabilize the vehicle or to otherwise assist the driver. Among these are, in particular, vehicle dynamics control systems such as ESP (electronic stability program), but also "driver-assistance systems" such as ACC (adaptive cruise control), as well as extra-value functions like, for example, APB (automatic parking brake) or a hill-hold function (HHC). These systems usually drive a hydraulic pump which builds up a desired setpoint brake pressure at a wheel. As a rule, the hydraulic pump is actuated in time-controlled manner. The driving time is defined by a model stored in the software.

Because of tolerances in the overall brake system, especially during the first phase of the pressure buildup, it is only conditionally possible to exactly reach the desired target pressure solely through the duration of the pump operating time. The brake pressure actually reached may therefore deviate relatively sharply from the target pressure. That is why known brake systems include a pressure-limiting valve, which is used to limit the pressure prevailing in the brake circuit to a predefined value. When the brake pressure generated by the hydraulic pump reaches the threshold value set at the valve, the valve becomes overloaded, and therefore the pressure is limited. In this case, the pressure threshold value is controlled via the electric valve current.

However, in systems having a pressure-limiting valve, it is problematic that the setting of the valve is also faulty. The pressure threshold value set can therefore deviate from the target pressure. In known systems, such a deviation from the target pressure is corrected by the superordinate vehicle controller. However, in the case of deceleration in the partial-braking range, this control process can lead to reactions (e.g., deceleration fluctuations, noises) noticeable to the driver, thereby impairing the control comfort.

SUMMARY OF THE INVENTION

Therefore, an object of the present invention is to provide a method and a device by which the exactitude of the pressure setting may be substantially improved, and consequently a desired target pressure may be achieved with greater precision.

This objective is achieved according to the present invention.

An important aspect of the present invention is to control the brake pressure in the brake circuit, in doing so, the pressure-limiting valve forming the final controlling element of the control. This has the significant advantage that the desired target pressure may be achieved with substantially greater precision.

The control setup of the present invention includes a controller unit to which a system deviation is supplied, and which readjusts the pressure-limiting valve accordingly. However, the system deviation is not formed as usual from a setpoint pressure $p_{setpoint}$ and an actual pressure $p_{mess}$, but rather preferably from an estimated pressure $p_{est}$ and the actual pressure $p_{mess}$. To estimate the brake pressure, preferably an estimating unit having a suitable estimating algorithm is provided. The estimating unit calculates the brake pressure, preferably taking the pump operating time, the pump rotational speed, the fluid temperature and possibly further parameters into account.

The actual pressure is measured by a suitable sensor system. In the case of setpoint-pressure specifications with dynamics that are not too high, a circuit pressure sensor may be used for that purpose, just as a wheel pressure sensor. To be understood by the term "wheel pressure sensor" in this context is a pressure sensor located behind the valves of the brake circuit on the side of the wheel. It is thereby possible to exactly record the pressure effectively acting on the wheel. On the other hand, a "circuit pressure sensor" is situated in front of the valves of the brake circuit.

The controller unit preferably includes a valve characteristic curve which represents the valve current over a setpoint pressure (p/I characteristic curve). Naturally, the valve characteristic curve could also be stored analytically. The controller unit is preferably designed in such a way that it modifies the valve characteristic curve, and consequently varies the pressure threshold value of the pressure-limiting valve until the system deviation is equal to zero. The correction of the valve characteristic curve has the advantage that it may be realized relatively easily in an existing control system.

According to one special specific embodiment, the controller unit calculates a correction factor, with which the valve characteristic curve is corrected. The correction factor is a function of the system deviation. The corrected characteristic curve is then further used for the following control phase and continues to be corrected stepwise. This method may be realized particularly easily.

After a pressure-control operation has ended, the valve characteristic curve is preferably set back again to the original value.

Inherent to the system, the estimating unit is encumbered with inaccuracies. According to the present invention, by preference, the estimating algorithm itself is therefore also corrected. Preferably, the correction is made on the basis of the measured actual pressure, which is supplied to the estimating unit and whose value should agree with the estimated value. Optionally, the pressure difference could also be supplied to the estimating unit for the purpose of the correction. Preferably, at least one parameter of the estimating algorithm is altered within the framework of a correction.

Since many interference effects usually have only a temporary influence on the driving of the valve, as a rule it is not necessary to store the correction factor in the system. Alternatively, the correction factor could naturally also be stored permanently in the system and adapted in the course of multiple control cycles. The control system would thus be able "to learn" some of the valve-specific interference factors, the control quality thereby being improved for later control cycles.

BRIEF DESCRIPTION OF THE DRAWING

The FIGURE shows the device according to the present invention.

DETAILED DESCRIPTION

The FIGURE shows a schematic representation of the controller structure of a control loop for controlling brake pressure p in a hydraulic brake system. The layout includes a vehicle system 1 such as ACC, for example, which, by an automatic brake actuation, is able to intervene in regulating or controlling fashion in the vehicle operation. When vehicle system 1 becomes active, it generates a setpoint pressure value $p_{setpoint}$, which is output to a pressure actuator 2. Vehicle system 1 and pressure actuator 2 are realized here as software modules which may be stored in one or in different control units.

Pressure actuator 2 includes a controller 3 having a valve characteristic curve 10 (p/I characteristic curve), which converts setpoint pressure $p_{setpoint}$ into a corresponding valve current $I_{setpoint}$. Valve current $I_{setpoint}$ forms the controlled variable for a pressure-limiting valve 7 which is used to limit the brake pressure to a predefined threshold value. The level of brake pressure p is determined by valve current $I_{setpoint}$.

The layout also includes a hydraulic pump 12 for building up brake pressure. Hydraulic pump 12 is activated by the control unit upon demand, and as a rule is operated until the wheel brake pressure has reached the threshold value set at (pressure) limiting valve 7, and the valve becomes overloaded (receives an overcurrent). The wheel brake pressure is thereby limited to the predefined threshold value.

To set setpoint pressure $p_{setpoint}$, demanded by vehicle system 1, as precisely as possible, the brake pressure is regulated here. For that purpose, a system deviation between a measured brake pressure $p_{mess}$ and an estimated brake pressure $p_{est}$ is supplied to controller 3.

The brake pressure actually prevailing is measured by a wheel pressure sensor 11. To estimate brake pressure p, an estimating unit 4 is also provided, which is stored as an algorithm in pressure actuator 2. A pressure difference Δp is formed from measured pressure $p_{mess}$ and estimated pressure $p_{est}$ at a subtracter node 5. Pressure difference Δp is fed back to controller unit 3. In this exemplary embodiment, the controller is designed in such a way that it corrects valve characteristic curve 10 as a function of system deviation Δp.

For example, the controller unit is able to calculate a correction factor, by which valve characteristic curve 10 is corrected. A correspondingly modified braking torque M, which brings about desired deceleration $a_{act}$ of vehicle 9, then takes effect at brake 8.

Estimating unit 4 is preferably designed so that it estimates the brake pressure from different variables, particularly the pump operating time, the pump rotational speed, fluid temperature, etc. The associated estimating algorithm is stored as a mathematical model in pressure actuator 2.

As mentioned, the output quantity of estimating unit 4 is used for determining system deviation Δp. However, estimated quantity $p_{est}$ is also supplied to controller 3 and, in particular, forms a switch-off criterion for hydraulic pump 12. The latter is switched off when estimated pressure $p_{est}$ has reached a predefined threshold value.

After a pressure-control operation has ended, the valve characteristic curve is preferably set back again to the original value.

What is claimed is:

1. A device for controlling a brake pressure in a brake system, with the aid of a pressure-limiting valve that limits the brake pressure to a predefined threshold value, and is driven by an electronic device in accordance with a valve characteristic curve, comprising:
   an estimating unit having an estimating algorithm for estimating the brake pressure based on at least one of a brake pump operating time, a brake pump rotational speed, and a brake fluid temperature;
   a sensor system for measuring the brake pressure in a brake circuit;
   a unit for determining a pressure difference between the measured pressure and the estimated pressure; and
   a controller unit for correcting the valve characteristic curve as a function of the pressure difference.

2. The device according to claim 1, wherein the brake system is a hydraulic brake system.

3. The device according to claim 1, wherein the controller unit calculates a correction factor with which the valve characteristic curve is corrected.

4. The device according to claim 1, wherein the sensor system includes a wheel pressure sensor.

5. The device according to claim 1, wherein the measured brake pressure or the pressure difference is supplied to the estimating unit, and the estimating algorithm is corrected on the basis of the pressure difference.

6. The device according to claim 1, wherein the valve characteristic curve is a p/I characteristic curve.

7. A method for controlling a brake pressure in a brake system, with the aid of a pressure-limiting valve that limits the brake pressure to a predefined threshold value, and is driven by an electronic device in accordance with a valve characteristic curve, the method comprising:
   estimating the brake pressure with the aid of an estimating unit based on at least one of a brake pump operating time, a brake pump rotational speed, and a brake fluid temperature;
   measuring the brake pressure using a sensor system;
   calculating a pressure difference between the measured brake pressure and the estimated brake pressure; and
   correcting the valve characteristic curve as a function of the pressure difference.

8. The method according to claim 7, wherein the brake system is a hydraulic brake system.

9. The method according to claim 7, further comprising:
   correcting an estimating algorithm of the estimating unit on the basis of the measured brake pressure or the pressure difference.

10. The method according to claim 7, wherein the brake pressure is measured by a wheel pressure sensor.

11. The method according to claim 7, wherein a controller unit, as a function of the pressure difference, calculates a correction factor with which the valve characteristic curve is corrected.

12. The method according to claim 7, further comprising:
   correcting an estimating algorithm of the estimating unit on the basis of the measured brake pressure or the pressure difference;
   wherein the brake system is a hydraulic brake system.

13. The method according to claim 12, wherein the brake pressure is measured by a wheel pressure sensor.

14. The method according to claim 12, wherein a controller unit, as a function of the pressure difference, calculates a correction factor with which the valve characteristic curve is corrected.

15. The method according to claim 12, wherein the brake pressure is measured by a wheel pressure sensor, and wherein a controller unit, as a function of the pressure difference, calculates a correction factor with which the valve characteristic curve is corrected.

16. The device according to claim 1, wherein the brake system is a hydraulic brake system, and wherein the controller unit calculates a correction factor with which the valve characteristic curve is corrected.

17. The device according to claim 16, wherein the valve characteristic curve is a p/I characteristic curve.

18. The device according to claim 16, wherein the sensor system includes a wheel pressure sensor, and wherein the measured brake pressure or the pressure difference is supplied to the estimating unit, and the estimating algorithm is corrected on the basis of the pressure difference.

19. The device according to claim 18, wherein the valve characteristic curve is a p/I characteristic curve.

20. The device according to claim 1, wherein the sensor system includes a wheel pressure sensor, and wherein the measured brake pressure or the pressure difference is supplied to the estimating unit, and the estimating algorithm is corrected on the basis of the pressure difference.

21. The device according to claim 20, wherein the valve characteristic curve is a p/I characteristic curve.

* * * * *

UNITED STATES PATENT AND TRADEMARK OFFICE
CERTIFICATE OF CORRECTION

PATENT NO.        : 8,489,301 B2                                          Page 1 of 1
APPLICATION NO.   : 12/227009
DATED             : July 16, 2013
INVENTOR(S)       : Crepin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1000 days.

Signed and Sealed this
Eighth Day of September, 2015

Michelle K. Lee
*Director of the United States Patent and Trademark Office*